(12) United States Patent
Peng et al.

(10) Patent No.: US 8,284,545 B2
(45) Date of Patent: Oct. 9, 2012

(54) ELECTRONIC READER WITH PAPER CLAMPING MECHANISM

(75) Inventors: Bo Peng, Shenzhen (CN); Ming Li, Shenzhen (CN); Wen-Hsing Lin, Taipei Hsien (TW); Kun-Chih Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 228 days.

(21) Appl. No.: 12/790,881

(22) Filed: May 31, 2010

(65) Prior Publication Data
US 2011/0128679 A1    Jun. 2, 2011

(30) Foreign Application Priority Data
Dec. 2, 2009 (CN) .......................... 2009 1 0310774

(51) Int. Cl.
*H05K 7/12*      (2006.01)
(52) U.S. Cl. ............... 361/679.01; 361/679.09; 248/917
(58) Field of Classification Search ............ 361/679.01, 361/679.02, 679.08, 679.09, 679.21, 679.26, 361/679.25; 248/917–924
See application file for complete search history.

(56) References Cited

U.S. PATENT DOCUMENTS

| | | | |
|---|---|---|---|
| 5,287,254 A * | 2/1994 | Solman | 362/98 |
| 6,097,595 A * | 8/2000 | Cipolla | 361/679.21 |
| 6,145,799 A * | 11/2000 | Khon | 248/442.2 |
| 7,542,270 B2 * | 6/2009 | Chen | 361/679.25 |
| 7,817,411 B2 * | 10/2010 | Lee et al. | 361/679.25 |
| 2010/0164836 A1 * | 7/2010 | Liberatore | 345/1.1 |

* cited by examiner

Primary Examiner — Jinhee Lee
Assistant Examiner — Ingrid Wright
(74) Attorney, Agent, or Firm — Altis Law Group, Inc.

(57) ABSTRACT

An electronic reader includes a cover, a middle frame and a paper clamping mechanism. The cover defines a hollow space and includes a bezel defining an opening. The middle frame is secured within the hollow space and includes a connection portion extending between two edges of the opening. The paper clamping mechanism is used for clamping paper on the electronic reader and includes a clamping member, a pivot, and an elastic element. The clamping member is received in the opening and defines a sliding groove. Two ends of the pivot extend through the sliding groove and are received in the bezel, which movably connects the clamping member to the cover. The elastic element is fixed on the bezel to apply a pushing force to the clamping member. Two ends of the clamping member resist the elastic element and the connection portion respectively.

20 Claims, 5 Drawing Sheets

ELECTRONIC READER WITH PAPER CLAMPING MECHANISM

BACKGROUND

1. Technical Field

The present disclosure relates to electronic readers and, particularly, to an electronic reader with a paper clamping mechanism.

2. Description of Related Art

Electronic readers such as electronic books that allow users to make notes are commonly known. However, people may be more accustomed to writing on paper in certain conditions. In addition, when there is no room on a surface such as a desktop, it is inconvenient for users to fix the paper securely to the electronic reader.

Therefore, what is needed is an electronic reader with a paper clamping mechanism alleviating the limitations described above.

DETAILED DESCRIPTION

Figure 1:
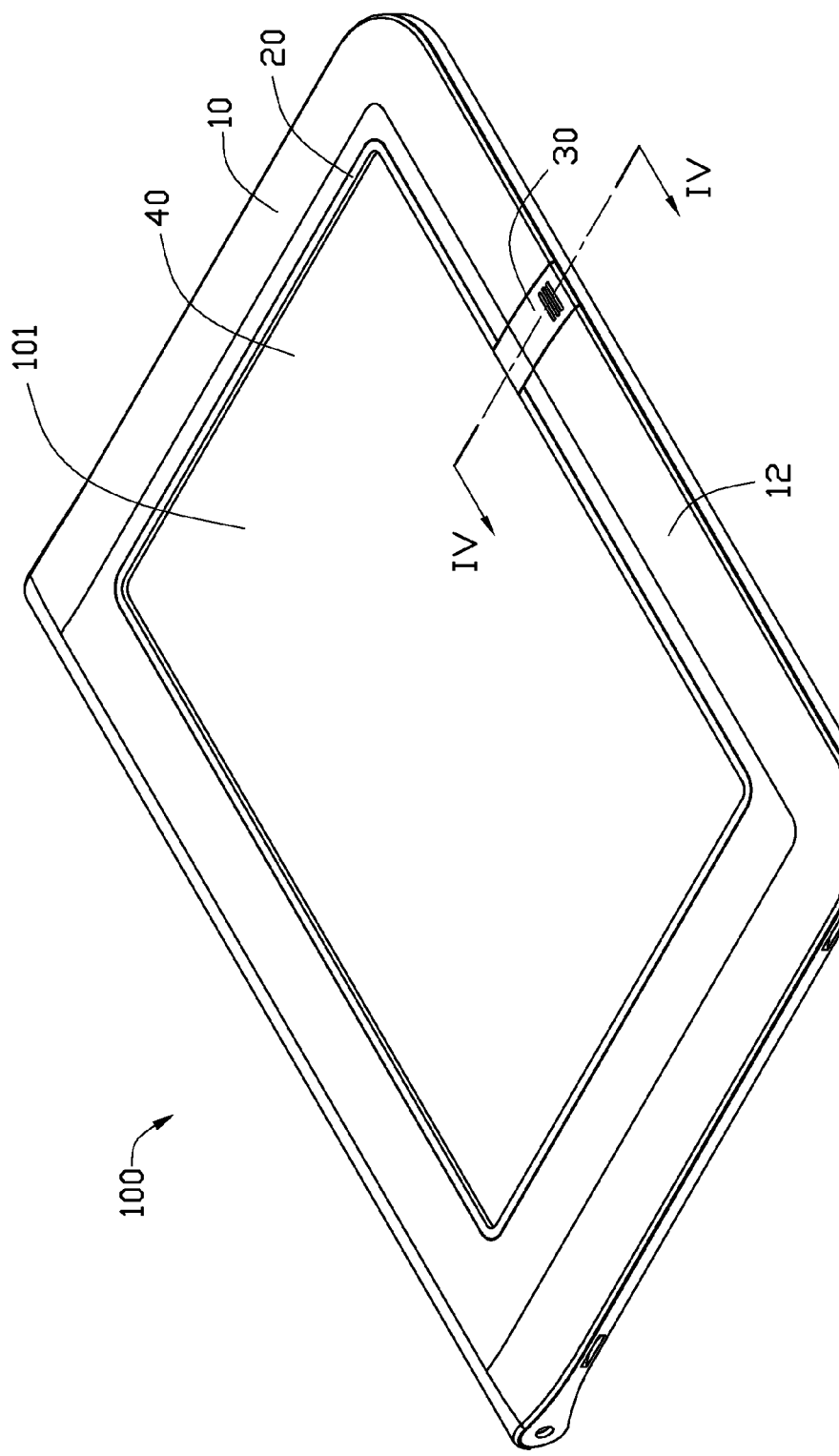
FIG. 1 is an isometric view of an exemplary embodiment of an electronic reader with a paper clamping mechanism.

Referring to FIG. 1, an electronic reader 100 is disclosed as an exemplary embodiment. The electronic reader 100 includes a rectangular frame shaped cover 10, a middle frame 20, a paper clamping mechanism 30 connected to the cover 10 and a display 40. A hollow space 101 is defined in the cover 10. The middle frame 20 is secured within the hollow space 101. The display 40 stays within the middle frame 20.

Figure 2:
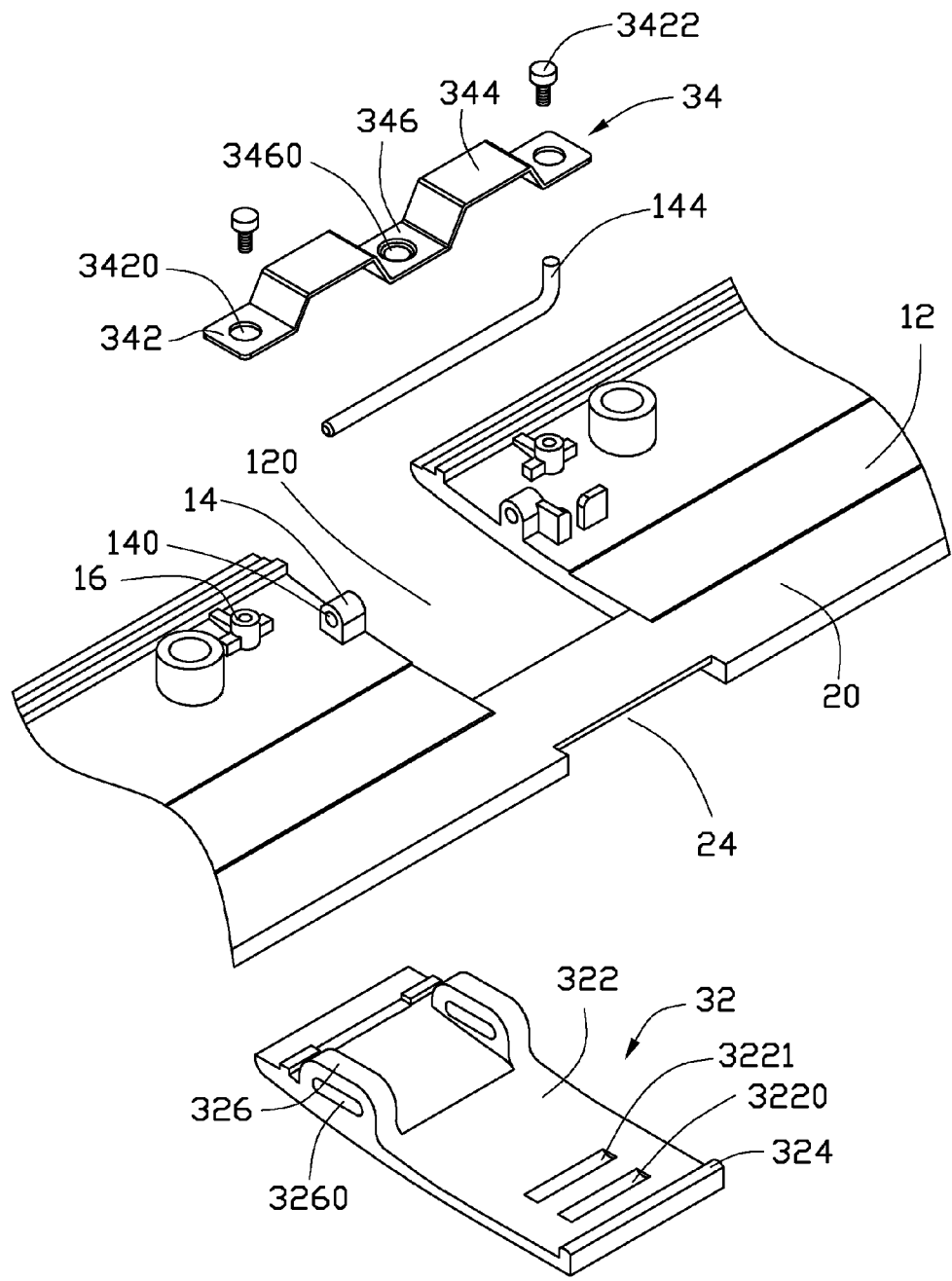
FIG. 2 is an exploded view of the paper clamping mechanism of the electronic reader of FIG. 1.

Referring to FIG. 2, the cover 10 includes a bezel 12, and an opening 120 defined in the bezel 12. Two fixing elements 14 for connecting the pivot and two fixing posts 16 protrude from an inner surface of the bezel 12. The two fixing elements 14 are arranged at two opposite edges of the opening 120 symmetrically. An axle hole 140 is defined in each fixing element 14. The two fixing posts 16 are arranged adjacent to the fixing elements 14, respectively.

Figure 3:
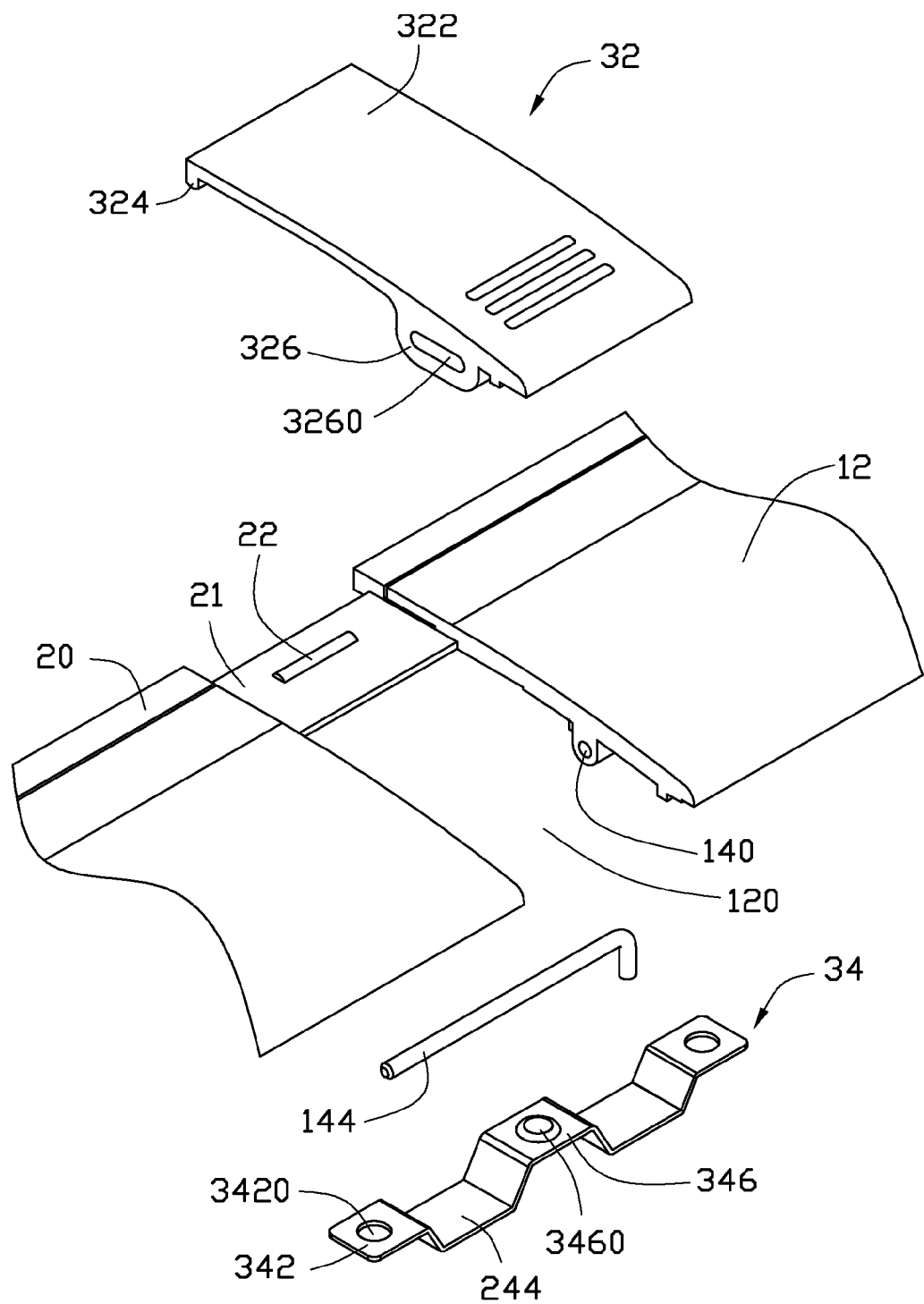
FIG. 3 is another exploded view the paper clamping mechanism of the electronic reader of FIG. 1, viewed from another perspective.

Referring to FIGS. 2 and 3, the middle frame 20 includes a connection portion 21. The connection portion 21 bridges two edges of the opening 120 and is thinner than the other portion of the middle frame 20. A fixing bar 22 protrudes from the outer surface of the connection portion 21. A notch 24 is defined in the connection portion 21.

The paper clamping mechanism 30 includes a clamping member 32, a pivot 144 and an elastic element 34. The clamping member 32 is rectangular and is received in the opening 120 and includes a base 322, a hook 324 and two arms 326. The hook 324 protrudes from one end of the base 322. The two arms 326 protrude from the inner surface of the base 322 adjacent to the two sides of the base 322, respectively. In other embodiments, the clamping member 32 may include only one arm 326 protruding from the inner surface of the base 322.

The thickness of the base 322 together with the thickness of the connection portion 21 of the middle frame 20 is approximately equal to the thickness of the other parts of the middle frame 20 except for the connection portion 21. Thus, the upper surface of the paper clamping mechanism 30 aligns with that of the cover 10 when the paper clamping mechanism 30 is in the folded status. Two grooves 3220 and 3221 are defined in the inner surface of the base 322 and extend along the widthwise direction of the base 322. The two grooves 3220 and 3221 are close to and parallel to the hook 324. Both of the two grooves 3220 and 3221 can receive the fixing bar 22 of the connection portion 21.

The hook 324 is received in and fits with the notch 24 of the middle frame 20 when the paper clamping mechanism 30 is in the folded status. Each arm 326 defines a sliding groove 3260 therein. The pivot 144 extends through the sliding grooves 3260 and two ends of which are received in the axle holes 140 of the fixing elements 14 respectively, thus connecting the clamping member 32 to the cover 10. The sliding grooves 3260 have lengths that allow the pivot 144 to slide along the lengthwise direction of the clamping member 32.

The elastic element 34 includes two fixing ends 342, a middle segment 346, and two connection segments 344 connecting the two fixing ends 342 with the middle segment 346. Each fixing end 342 defines a though hole 3420. The diameter of the though hole 3420 is a little larger than the diameter of the fixing post 16 of the bezel 12. A protrusion 3460 protrudes from the middle segment 346 and resists the inner surface of the base 322. After the fixing posts 16 are extended through the through holes 3420, the elastic element 34 is fixed on the bezel 12 via screws 3422 fastened to the fixing post 16. In other embodiments, the elastic element 34 may be fixed on the bezel 12 in other manners, such as hooks, or rivets.

Figure 4:
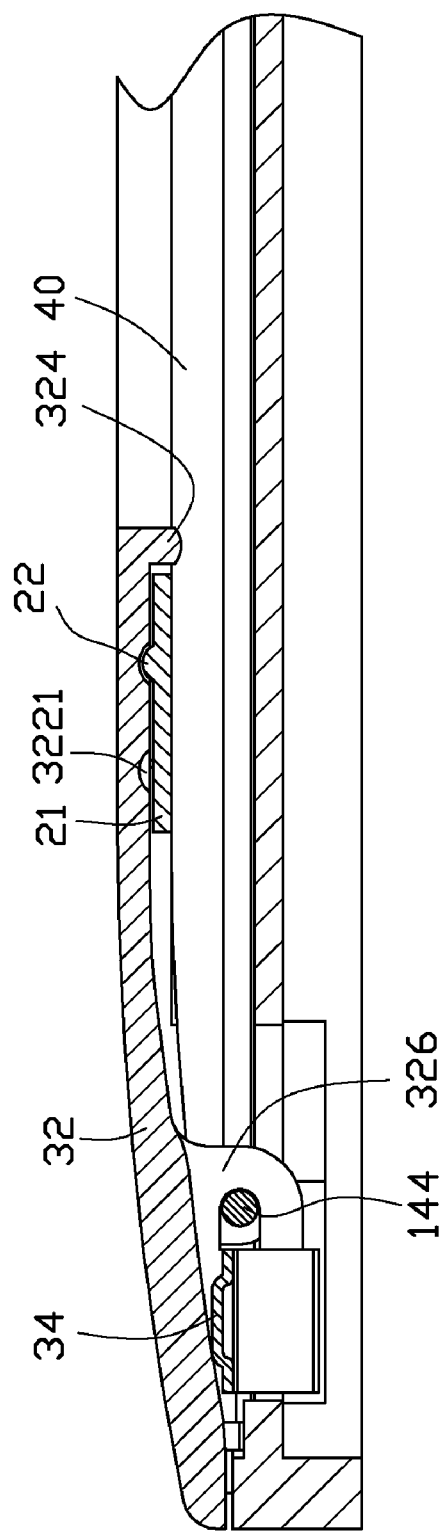
FIG. 4 is a cross-sectional view of the electronic reader of FIG. 1, taken along lines of IV-IV, showing the paper clamping mechanism in a first position.

Referring to FIG. 4, when the paper clamping mechanism 30 is in the folded status, the clamping member 32 is received in the opening 120 of the bezel 12. The hook 324 is received in the notch 24 of the middle frame 20. The fixing bar 22 of the connection portion 21 is received in the groove 3220. The protrusion 3460 resists the inner surface of the base 322.

Figure 5:
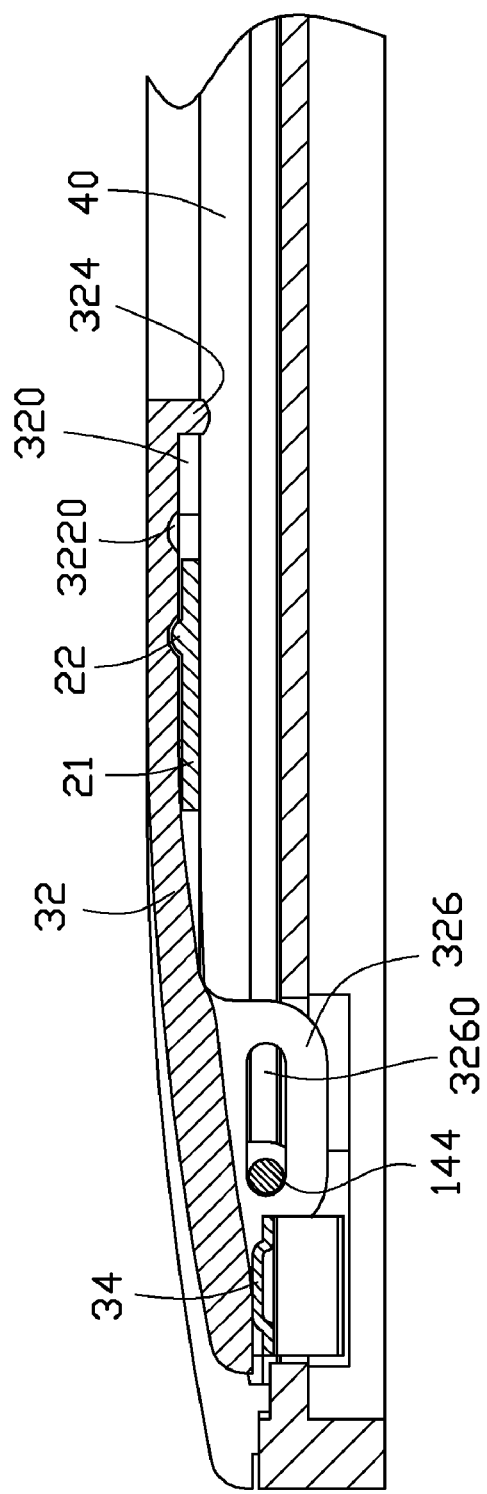
FIG. 5 is similar to FIG. 4, but showing the paper clamping mechanism in a second position.

In use, referring to FIG. 5, the clamping member 32 is pushed to slide inward, causing the groove 3220 to disengage from the fixing bar 22, until the pivot 144 is stopped by an end of the groove 3260. The fixing bar 22 is received in the groove 3221. The clamping member 32 is rotated to form a gap 320 between the hook 324 and the display 40 to receive paper (not shown). The elastic element 34 applies a pushing force to the end opposing the hook 324, causing the hook 324 to press the papers firmly against the display 40.

The paper clamping mechanism 30 can stably clamp papers on the electronic reader 100, and the display 40 supports the papers, bringing much more convenience to users having the need to make notes on papers.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic reader comprising:
   a cover defining a hollow space and comprising a bezel defining an opening;
   a middle frame secured within the hollow space and comprising a connection portion extending between two edges of the opening; and
   a paper clamping mechanism for clamping paper on the electronic reader, the paper clamping mechanism comprising:

a clamping member received in the opening and defining a sliding groove, the clamping member comprising a first end resting on the connection portion and a second end opposite to the first end; and a pivot, two ends of the pivot extending through the sliding groove and received in the bezel, which movably connects the clamping member to the cover; and an elastic element fixed on the bezel and supporting the second end to apply a pushing force to the clamping member; wherein two ends of the clamping member resist the elastic element and the connection portion respectively.

2. The electronic reader as described in claim 1, wherein the clamping member comprises:

a hook protruding from an inner surface of the clamping member at the first end; and at least one arm protruding adjacent to the second end of the clamping member, and the sliding groove defined in the at least one arm.

3. The electronic reader as described in claim 2, wherein the number of the at least one arm is two, and the two arms protrude from two sides of the clamping member, respectively.

4. The electronic reader as described in claim 2, wherein the electronic reader further comprises a display staying within the middle frame; and the paper is clamped between the display and the hook.

5. The electronic reader as described in claim 2, wherein the connection portion defines a notch, and the hook is received in the notch.

6. The electronic reader as described in claim 5, wherein the connection portion comprises a fixing bar protruding an outer surface wherefrom, and the clamping member defines two grooves in the inner surface close to and parallel to the hook, for selectively receiving the fixing bar.

7. The electronic reader as described in claim 6, wherein the clamping member is rectangular and both of the two grooves of the inner surface extend along the widthwise direction of the clamping member.

8. The electronic reader as described in claim 1, wherein two fixing elements for connecting the pivot and two fixing posts protrude from an inner surface of the bezel for fixing the elastic member; the two fixing elements are arranged at two opposite edges of the opening; and the two fixing posts are arranged adjacent to the fixing elements, respectively.

9. The electronic reader as described in claim 8, wherein the fixing element defines an axle hole.

10. The electronic reader as described in claim 8, wherein the elastic element comprises two fixing ends, a middle segment and two connection segments connecting the two fixing ends and the middle segment; the fixing end defines a though hole, the diameter of the though hole is a little greater than the diameter of the fixing post of the bezel.

11. The electronic reader as described in claim 10, wherein a protrusion protrudes from the middle segment and resists the inner surface of the clamping member.

12. An electronic reader comprising:

a cover defining a hollow space and comprising a bezel defining an opening;

a middle frame secured within the hollow space, the middle frame comprising a connection portion extending between two edges of the opening;

a display disposed within the middle frame; and a paper clamping mechanism for clamping paper on the display, an upper surface of which aligning with an upper surface of the cover, the paper clamping mechanism comprising:

a clamping member received in the opening and defining a sliding groove, the clamping member comprising a first end resting on the connection portion and a second end opposite to the first end; and a pivot, two ends of the pivot extending through the sliding groove and received in the bezel, which movably connects the clamping member to the cover; and an elastic element fixed on the bezel, and resisting the second end of the clamping member to apply a pushing force to the clamping member, wherein the clamping member is slidable along the sliding groove to clamp the paper on the display.

13. The electronic reader as described in claim 12, wherein the clamping member comprises:

a hook protruding from an inner surface of the clamping member at the first end; and at least one arm protruding adjacent to the second end of the clamping member, and the sliding groove defined in the at least one arm.

14. The electronic reader as described in claim 13, wherein the paper is clamped between the display and the hook.

15. The electronic reader as described in claim 13, wherein the connection portion defines a notch, and the hook is received in the notch.

16. The electronic reader as described in claim 15, wherein the connection portion comprises a fixing bar protruding from an outer surface connection portion, and the clamping member defines two grooves close to and parallel to the hook, for selectively receiving the fixing bar.

17. The electronic reader as described in claim 16, wherein the clamping member is rectangular and both of the two grooves of the inner surface extend along the widthwise direction of the clamping member.

18. The electronic reader as described in claim 13, wherein two fixing elements for connecting the pivot and two fixing posts protrude from an inner surface of the bezel for fixing the elastic member; the two fixing elements are arranged at two opposite edges of the opening; and the two fixing posts are arranged adjacent to the fixing elements, respectively.

19. The electronic reader as described in claim 18, wherein the elastic element comprises two fixing ends, a middle segment and two connection segments connecting the two fixing ends and the middle segment; the fixing end defines a though hole, the diameter of the though hole is a little greater than the diameter of the fixing post of the bezel.

20. The electronic reader as described in claim 19, wherein a protrusion protrudes from the middle segment and resists the inner surface of the clamping member.

* * * * *